June 4, 1963  H. E. KNAPPE  3,092,365
PLUG VALVE
Filed June 23, 1960  3 Sheets-Sheet 2

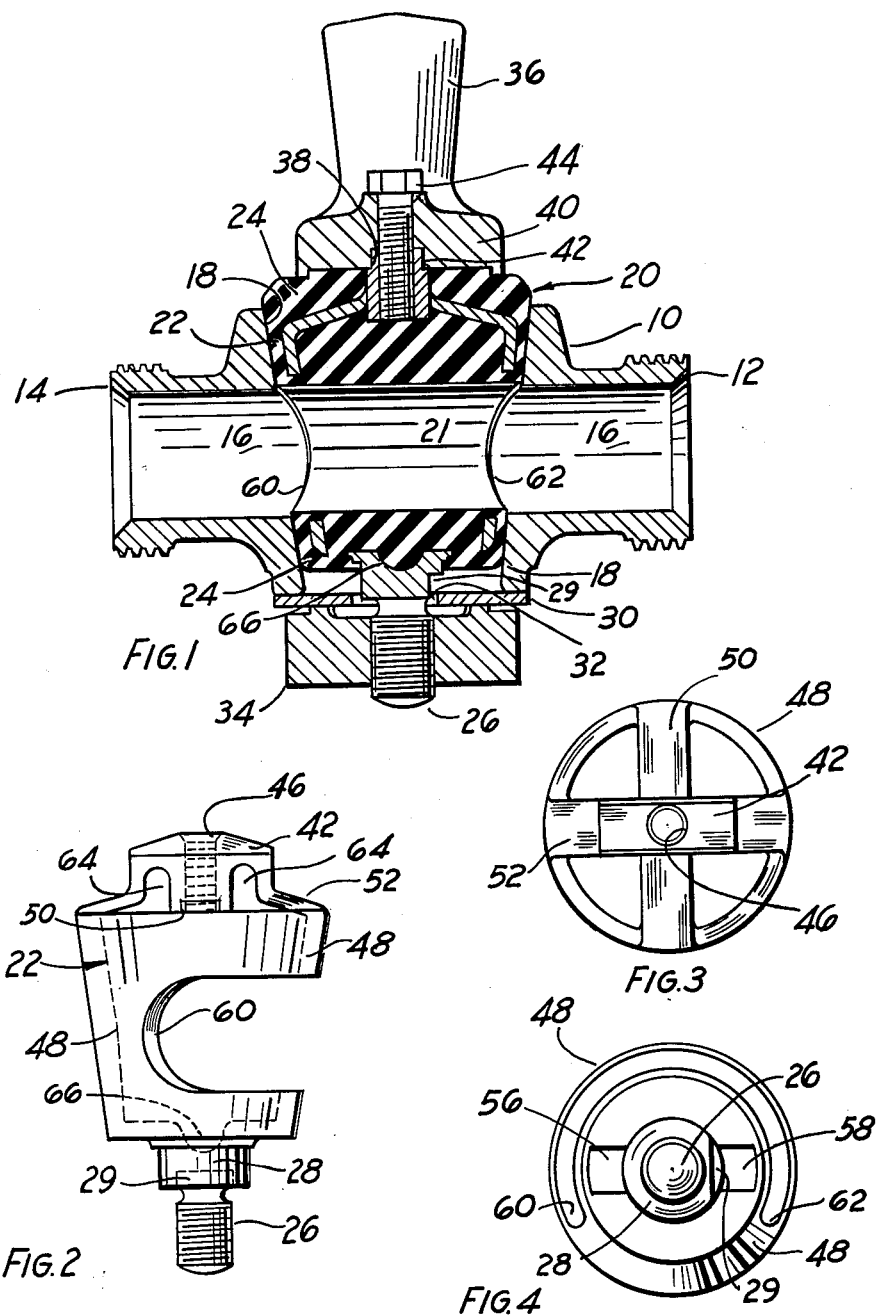

HERMAN E. KNAPPE INVENTOR.
BY
ATTORNEYS

June 4, 1963   H. E. KNAPPE   3,092,365
PLUG VALVE
Filed June 23, 1960   3 Sheets-Sheet 3
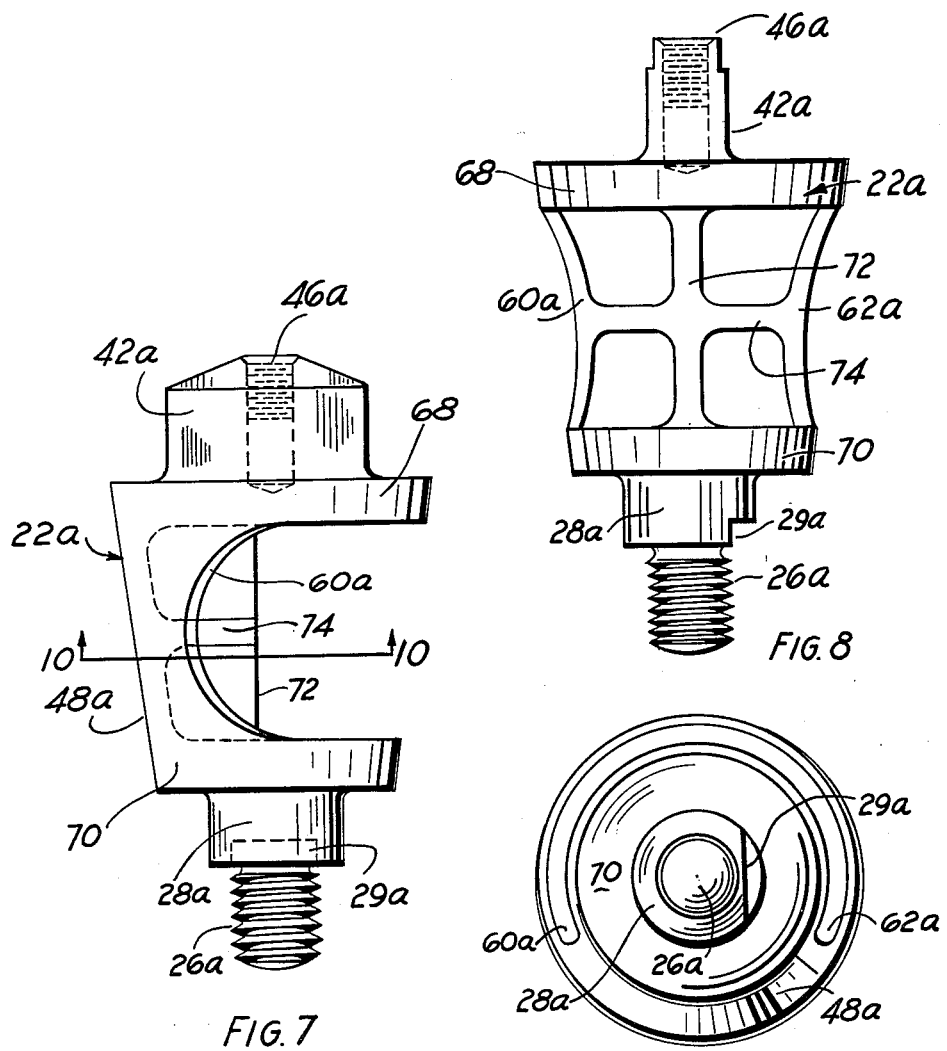
FIG. 7
FIG. 8
FIG. 9
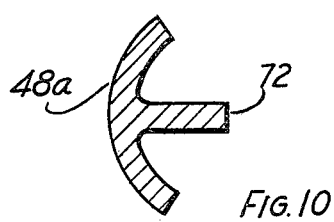
FIG. 10
HERMAN E. KNAPPE INVENTOR.
BY
ATTORNEYS United States Patent Office 3,092,365
Patented June 4, 1963

3,092,365
PLUG VALVE
Herman E. Knappe, Cedar Rapids, Iowa, assignor to Cherry-Burrell Corporation, Cedar Rapids, Iowa, a corporation of Delaware
Filed June 23, 1960, Ser. No. 38,339
3 Claims. (Cl. 251—309)

This invention relates to an improvement in plug valves of the sanitary type that must be frequently disassembled for cleaning purposes, and more particularly relates to improvements in such valves in which the plug is rubber covered.

A valve of the type to which my invention relates is shown in U.S. Patent No. 2,832,563. The plugs for valves of this type were all originally made entirely of stainless steel, but as disclosed in Patent No. 2,832,563, there are certain advantages from making the plugs with a solid metal core covered by a thin layer of rubber or plastic material. Some of these advantages of a rubber-covered plug are that this construction allows the use of a less expensive metal, such as cast iron, for the plug and eliminates the possibility of damage to the plug that could result in improper seating of the plug in the valve.

These rubber-covered plug valves have proven to be very satisfactory and are widely used in the food and dairy industries. To maintain the high standards of sanitation required by their use in these industries, the valves must be frequently cleaned. Many of the cleaning solutions used have a corrosive effect on metal. Also, these valves are frequently used in processing plants where the humidity is very high, and rust readily forms on the metal core and sometimes bleeds through the rubber covering. Since stainless steel has a high resistance to corrosion, it would greatly improve these rubber-covered plug valves if this material were used for the core. However, stainless steel is relatively expensive and using it for the core material defeats one of the purposes for using a rubber coating on the valve plugs, namely, reduced cost. Since the sale of these valves has become highly competitive, cost has become an incerasingly important factor for successful sales.

It is therefore a principal object of my invention to provide an improved rubber-covered plug valve at a reduced cost.

It is another object of my invention to provide an improved rubber-covered plug valve that has all the advantages of known plug valves but is easier and less expensive to manufacture.

It is a further object of my invention to provide an improved plug for a valve that is considerably lighter in weight and therefore easier to handle and less expensive to ship.

It is a still further object of my invention to provide a plug for a sanitary valve that is not affected by strong cleaning solutions or other conditions that promote corrosion.

It is another object of my invention to provide a plug that has a hollow stainless steel core filled and covered by a rubber or plastic material.

It is a still further object of my invention to provide a plug valve that is sanitary in all respects, non-toxic, and free from substances that could migrate into the product being processed thereby contaminating it.

These and other objects of my invention will be apparent from a consideration of the following description taken in connection with the accompanying drawings in which:

FIGURE 1 is a cross-sectional view of a plug valve of the type of which my invention relates;

FIGURE 2 is a side elevational view showing the core of the plug without the rubber molded thereon;

FIGURE 3 is a top view of the core shown in FIGURE 2;

FIGURE 4 is a bottom view of the core;

FIGURE 7 is a view similar to FIGURE 2 but showing a modification of my invention;

FIGURE 8 is a front elevational view of the core shown in FIGURE 7;

FIGURE 9 is a bottom view of the core; and

FIGURE 10 is a sectional view taken on the line 10—10 of FIGURE 7.

Figure 5:
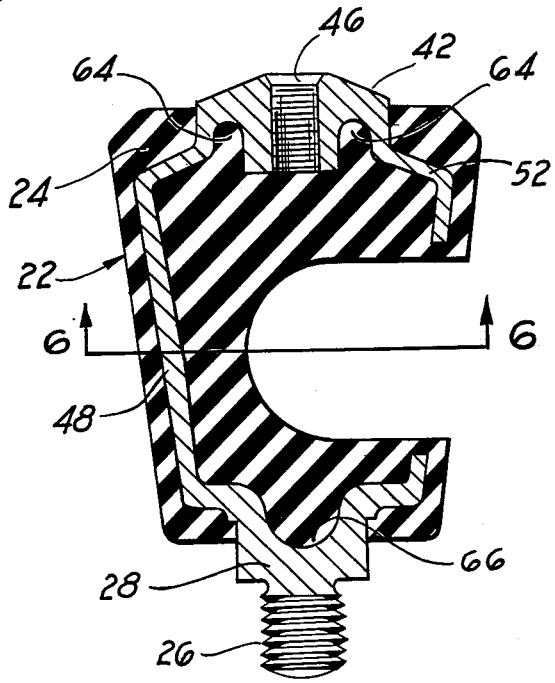
FIGURE 5 is a cross-sectional view of the plug.

Referring now to the drawings, FIGURE 1 shows a two-way plug valve consisting of a valve body 10 having at least two open ends 12 and 14 that are threaded for connection to pipelines carrying milk or other fluid. For a three-way valve, an additional open end (not shown) can be formed on the valve body 10. A passageway 16 provides for fluid flow through the valve body 10 from end 12 to end 14. Substantially perpendicular to passageway 16 and in the center of the valve body 10 is a large conically-shaped opening 18 that provides a seat for a plug indicated generally by the reference numeral 20. Plug 20 has a passageway 21 extending there-through that is positioned to register with passageway 16 when the plug is turned to the open position, as shown in FIGURE 1.

The plug 20 is comprised of a core 22 upon which there is molded a suitable plastic or rubber material 24. A threaded stud 26 extends downward from the bottom of core 22 along its central axis. The stud 26 projects from a shoulder 28 that has at least one flat side 29. When the plug 20 is properly seated in seat 18, the stud 26 and part of the shoulder 28 extend beyond the bottom of the valve body 10.

A large washer 30, of at least equal outside diameter to the bottom of the valve body 10, has a central opening 32 slightly larger than shoulder 28. Opening 32 has a flat side corresponding to the flat side 29 of the shoulder 28. Thus, the stud 26 and shoulder 28 can be passed through opening 32 so that the washer 30 will fit tightly against the bottom of the valve body 10 with the flat side 29 of shoulder 28 engaging the flat side of the opening 32.

A nut 34 is threaded on the stud 26 and when tightened will seat the plug 20 tightly in seat 18 and also prevent fluid pressure from turning the plug 20 thereby changing its position relative to the passageway 16.

Turning of the plug 16 in the valve body 10 is accomplished by means of a handle 36 that is secured to the top of the core 22. The handle 36 has a rectangular-shaped keyway 38 formed in the fastening portion 40 thereof, the keyway 38 corresponding to a projection 42 that is either formed integrally with the core 22 or securely fastened thereto. The handle 36 is maintained in position on projection 42 by means of a stud 44 threadably received in a threaded opening 46 in the projection 42.

The core 22 is of a frusto-conical shape and is hollow with relatively thin sidewalls 48. Two ribs 50 and 52 extend diametrically across the top of the core 22. The two ribs 50 and 52 are substantially perpendicular to each other and provide a support for the projection 42 to which handle 36 is attached. When the handle is turned to open or close the valve, the ribs 50 and 52 resist the torsional forces exerted. The bottom of the core 22 is closed except for two holes 56 and 58 whose function is to allow air to escape when the rubber material 24 is molded onto the core 22.

In order to provide communication between the open ends 12 and 14 through passageway 16, a portion of the sidewall 48 of core 22 is cut out to form the passageway 21. The cutout portion leaves two curved surfaces 60 and 62 formed in the sidewalls 48.

Figure 6:
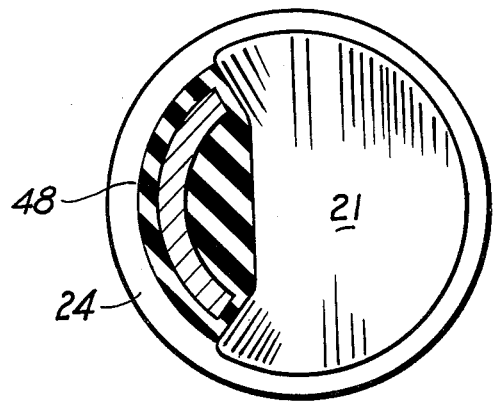
FIGURE 6 is a cross-sectional view of the plug taken on line 6—6 of FIGURE 5.

Molded onto this hollow core 22 is the covering material 24 which may be rubber, plastic or other suitable material. At the present time, we have found certain rubber compositions to give the most satisfactory results. One of these is Buna-N. This material, whether rubber, plastic or some other material, of course must be tasteless, odorless, non-toxic, and otherwise suitable for use with dairy and food products. As best seen in FIGURES 5 and 6, the rubber covering 24 makes up a substantial portion of the plug 20. In other words, the rubber material 24 is more than just a thin covering over the core 22, but the core 22 obviously is necessary to give strength to the material 24 and provide a foundation for stud 26 and projection 42.

To improve the bond between the rubber material 24 and the core 22, pockets 64 may be formed near the top of core 22 beneath the projection 42. Pocket 66 in the bottom of core 22 also is for this purpose.

Referring now to FIGURES 7-9, parts corresponding to those of the first embodiment will be referred to by the same reference numeral followed by the subscript "a." This core 22a is particularly adapted for use in plug valves of a larger size than those of the first embodiment. The core 22a is of a frustro-conical shape and is hollow with relatively thin side walls 48a. The top 68 of the core 22a is a solid circular disc formed integral with the sidewalls 48a.

A rectangular-shaped projection or boss 42a is formed on the top 68 and has a threaded opening 46a. The valve handle (not shown) fits over the boss 42a and is secured to the core 22a by a stud (not shown) threaded into opening 46a.

The bottom 70 of the core 22a is also a solid circular disc formed integral with the sidewalls 48a. A threaded stud 26a projects downward from a shoulder 28a on the bottom 70. Shoulder 28a has at least one flat side 29a.

As in the first embodiment, a portion of the sidewalls 48a of core 22a are cut out to provide for flow through the valve. The cut out portion leaves two curved surfaces 60a and 62a formed in the sidewalls 48a.

For additional strength, core 22a has a vertical rib 72 along the center of the rear portion of sidewall 48a and a horizontal rib 74 also centrally located. These ribs 72 and 74 help to bond the rubber or plastic covering to the core 22a.

Plug 20 can be used in either two-way or three-way valves. Thus, it is unnecessary to manufacture and keep on hand more than one type plug for both of these commonly used valves.

The plug 20 is considerably lighter in weight and less expensive than plugs made either entirely of stainless steel or of a metal core covered with a thin coating of rubber. Also, my novel plug has the advantage over the thinly covered plugs in that a better bond is obtained between the covering material and the metal core. Because the quantity of metal used in the plug 20 is greatly reduced, the core 22 or 22a can be constructed of stainless steel which has many advantages from a sanitary standpoint. The plug 20 can be placed in strong cleaning solution without the danger of corrosion of the metal core. This was not true where a heavy solid core of cast iron or aluminum is covered with a thin rubber coating.

Having thus described my invention it will be obvious to those skilled in the art that various revisions and modifications can be made in my novel plug valve without departing from the spirit and scope of my invention. It is my intention, however, that such revisions and modifications be included within the scope of the following claims.

I claim:

1. In a sanitary plug valve having a main body with a frustum-shaped seat therein and a flow passage extending through said body transversely to said seat, a valve plug adapted to be turnable in said seat, said plug comprising a hollow core of rigid, strong material, said core including parallel spaced apart end walls joined by a thin side wall the general exterior configuration of which is substantially the same as the plug, a shoulder extending from each of said end walls, rubber-like material covering and filling said core and extending over each end wall and surrounding each of said shoulders, a handle for turning said plug secured to one of said shoulders, and plug retaining means combined with the other shoulder, said plug having a passageway adapted to register with the flow passage in said valve body when said plug is turned to the open position, the passageway extending completely through one side of the plug and defined on one side by the valve body and on the opposite side by a central straight portion with diverging side potrions whereby said plug can be used in both two-way and three-way valve bodies.

2. In a sanitary plug valve having a main body with a frustum-shaped seat therein and a flow passageway extending through said body transversely to said seat, a tapered valve plug adapted to be turnable in said seat, said plug comprising a hollow core of rigid, strong material, said core including parallel spaced-apart circular end walls joined by a thin side wall the general exterior configuration of which corresponds to the shape of said seat, a shoulder extending from each of said end walls, rubber-like material covering and filling said core and extending over each end wall and surrounding each of said shoulders to form the tapered plug, the plug having a cutout portion providing a port therein, the cutout portion extending completely through opposed portions of the side wall between the end walls and having a width along a line parallel with the axis of said plug that is considerably less than the distance between the end walls so as to form hollow oppositely facing chambers at said end walls and within said core, the rubber-like material also filling said chambers, the port in the plug being positioned to register with the flow passageway in said valve body when said plug is seated in said body and turned to the open position, a handle for turning said plug secured to one of said shoulders, and removable plug retaining means combined with the other shoulder to hold said plug in its seat in said valve body.

3. In the valve plug of claim 2, strengthening means comprising a first relatively thin rib connecting said end walls about midway between the remaining portions of the side wall and a second relatively thin rib transverse to said first rib and connecting said remaining portions of the side wall about midway between the end walls.

References Cited in the file of this patent

UNITED STATES PATENTS

| 222,727 | Peck | Dec. 16, 1879 |
| 1,203,766 | Miller | Nov. 7, 1916 |
| 2,368,887 | Schuler | Feb. 6, 1945 |
| 2,634,946 | Mueller | Apr. 14, 1953 |
| 2,782,801 | Ludwig | Feb. 26, 1957 |
| 2,832,563 | Walsh | Apr. 19, 1958 |
| 2,864,579 | Stoltenberg | Dec. 16, 1958 |
| 2,876,985 | Birchall | Mar. 10, 1959 |

FOREIGN PATENTS

| 1,064,281 | France | Dec. 23, 1953 |
| 1,066,393 | Germany | Oct. 1, 1959 |